(12) United States Patent
Morjaria et al.

(10) Patent No.: US 7,523,001 B2
(45) Date of Patent: Apr. 21, 2009

(54) METHOD AND APPARATUS FOR OPERATING WIND TURBINE GENERATORS

(75) Inventors: Mahesh Amritlal Morjaria, Marietta, GA (US); Rui Zhou, Mason, OH (US); Amit Chandrakant Joshi, Bangalore Karnataka (IN); Abhinanda Sarkar, Bangalore Karnataka (IN); Vineel Chandrakanth Gujjar, Bangalore Karnataka (IN)

(73) Assignee: General Electric Company, Schenectady, NY (US)

( * ) Notice: Subject to any disclaimer, the term of this patent is extended or adjusted under 35 U.S.C. 154(b) by 254 days.

(21) Appl. No.: 11/536,385

(22) Filed: Sep. 28, 2006

(65) Prior Publication Data
US 2008/0079263 A1 Apr. 3, 2008

(51) Int. Cl.
*G06F 19/00* (2006.01)
*G06F 17/40* (2006.01)

(52) U.S. Cl. ........... 702/3; 290/44; 700/9; 700/286; 700/287; 700/291; 702/182; 702/188

(58) Field of Classification Search ............ 60/269; 73/112.01; 290/43, 44; 700/1, 9, 90, 286, 700/287, 291; 702/1, 2, 3, 127, 182, 188, 702/189
See application file for complete search history.

(56) References Cited

U.S. PATENT DOCUMENTS

| | | | |
|---|---|---|---|
| 4,155,252 A * | 5/1979 | Morrill | 73/170.08 |
| 6,320,272 B1 * | 11/2001 | Lading et al. | 290/44 |
| 6,512,966 B2 * | 1/2003 | Lof et al. | 700/291 |
| 6,566,764 B2 * | 5/2003 | Rebsdorf et al. | 290/44 |
| 6,671,585 B2 * | 12/2003 | Lof et al. | 705/36 R |
| 6,856,038 B2 * | 2/2005 | Rebsdorf et al. | 290/44 |
| 6,925,385 B2 * | 8/2005 | Ghosh et al. | 702/14 |
| 6,975,925 B1 * | 12/2005 | Barnes et al. | 700/286 |
| 7,099,800 B2 * | 8/2006 | Henriksen et al. | 702/187 |
| 7,250,691 B2 * | 7/2007 | Enis et al. | 290/55 |
| 2002/0079706 A1 * | 6/2002 | Rebsdorf et al. | 290/55 |
| 2002/0084655 A1 * | 7/2002 | Lof et al. | 290/44 |
| 2002/0087234 A1 | 7/2002 | Lof et al. | |
| 2002/0103745 A1 * | 8/2002 | Lof et al. | 705/37 |
| 2002/0194113 A1 * | 12/2002 | Lof et al. | 705/37 |
| 2003/0006613 A1 * | 1/2003 | Lof et al. | 290/44 |
| 2003/0126060 A1 * | 7/2003 | Lof et al. | 705/36 |

(Continued)

FOREIGN PATENT DOCUMENTS

JP 2002152975 5/2002

(Continued)

*Primary Examiner*—Edward R Cosimano
(74) *Attorney, Agent, or Firm*—James McGinness, Esq.; Armstrong Teasdale LLP

(57) ABSTRACT

A method of operating a wind farm that includes a plurality of wind turbine generators (WTGs) includes generating wind turbine generator (WTG) availability data for each WTG. The method also includes generating wide-area meteorological data for a first geographical region. The method further includes generating narrow-area meteorological forecast data for a second geographical region by transmitting at least a portion of the wide-area meteorological data to at least one resident narrow-area meteorological forecast algorithm. The first geographical region includes at least a portion of the second geographical region. The method also includes generating electric power production forecast data by using at least one resident electric power production forecast algorithm to manipulate the WTG availability data and the narrow-area meteorological forecast data.

20 Claims, 2 Drawing Sheets

U.S. PATENT DOCUMENTS

| | | |
|---|---|---|
| 2004/0026929 A1* | 2/2004 | Rebsdorf et al. ............... 290/44 |
| 2004/0207207 A1 | 10/2004 | Stahlkopf |
| 2004/0230377 A1* | 11/2004 | Ghosh et al. ................... 702/3 |
| 2004/0267466 A1 | 12/2004 | Enis et al. |
| 2005/0107989 A1 | 5/2005 | Henriksen et al. |
| 2005/0127680 A1* | 6/2005 | Lof et al. ...................... 290/44 |
| 2005/0225091 A1* | 10/2005 | Enis et al. ..................... 290/44 |
| 2006/0232895 A1* | 10/2006 | Enis et al. ..................... 361/20 |

FOREIGN PATENT DOCUMENTS

| | | |
|---|---|---|
| JP | 2003180032 | 6/2003 |
| JP | 2004312797 | 11/2004 |

* cited by examiner

METHOD AND APPARATUS FOR OPERATING WIND TURBINE GENERATORS

BACKGROUND OF THE INVENTION

This invention relates generally to wind turbine generators and more particularly, to methods and apparatus for operating wind turbine generators.

Wind energy is sometimes used to generate electrical power via some known wind turbine generators (WTGs) using the rotation of large wind turbines to drive electrical generators. Pluralities of WTGs are sometimes congregated within a predetermined geographical region to form power plants. Such power plants are often referred to as wind farms or wind power plants. Because wind speed and direction may change with time, electric power output from the generators of a wind farm may also change with time. Generally, such wind farms are integrated into an electric power system. A group of electric power systems, other electric power plants, and associated infrastructure spread over a geographical region is sometimes referred to as a grid. Such other electric power plants are typically plants that generate electric power from coal, steam, a combustible fluid, water, and/or solar energy and may also include, but are not limited to, gas turbine power stations, nuclear power plants, or even other wind farms. Variations in electric power output from such wind farms may cause variations not only in an amount of electric power flowing from the wind farm but also the frequency of the grid to which the electrical power is delivered for subsequent consumption thereof. A decrease in electric power output from the wind farm may cause a deficiency in electric power delivered to a local region of the grid in which the wind farm is embedded, as well as electric power delivered to other areas of the grid.

BRIEF DESCRIPTION OF THE INVENTION

In one aspect, a method of operating a wind farm includes a plurality of wind turbine generators (WTGs) is provided. The method includes generating wind turbine generator (WTG) availability data for each WTG. The method also includes generating wide-area meteorological data for a first geographical region. The method further includes generating narrow-area meteorological forecast data for a second geographical region by transmitting at least a portion of the wide-area meteorological data to at least one resident narrow-area meteorological forecast algorithm. The first geographical region includes at least a portion of the second geographical region. The method also includes generating electric power production forecast data by using at least one resident electric power production forecast algorithm to manipulate the WTG availability data and the narrow-area meteorological forecast data.

In another aspect, a production forecasting system for an electric power generator is provided. The system includes at least one meteorological forecast input channel configured to transmit at least one wide-area meteorological forecast data signal. The system also includes at least one resident narrow-area meteorological forecast algorithm configured to receive the at least one wide-area meteorological forecast data signal. The narrow-area meteorological forecast algorithm is further configured to generate and transmit at least one narrow-area meteorological forecast data signal. The system further includes at least one resident electric power generation availability algorithm configured to generate and transmit at least one electric power generation availability data signal. The system also includes at least one resident electric power production forecast algorithm configured to receive the at least one narrow-area meteorological forecast data signal and the at least one electric power generation availability data signal. The at least one resident electric power production forecast algorithm is further configured to generate and transmit at least one electric power production forecast data signal.

In a further aspect, a forecasting network for a wind farm having a plurality of wind turbine generators (WTGs) is provided. The network includes at least one operational database comprising operational data and at least one meteorological forecasting data source. The network also includes at least one production forecasting system coupled in electronic data communication with the at least one operational database and at least one meteorological forecasting data source. The at least one production forecasting system includes at least one meteorological forecast input channel, at least one resident narrow-area meteorological forecast algorithm, at least one resident electric power generation availability algorithm, and at least one resident electric power production forecast algorithm. The at least one meteorological forecast input channel is configured to transmit at least one wide-area meteorological forecast data signal. The at least one resident narrow-area meteorological forecast algorithm is configured to receive the at least one wide-area meteorological forecast data signal. The narrow-area meteorological forecast algorithm is further configured to generate and transmit at least one narrow-area meteorological forecast data signal. The at least one resident electric power generation availability algorithm is configured to generate and transmit at least one electric power generation availability data signal. The at least one resident electric power production forecast algorithm is configured to receive the at least one narrow-area meteorological forecast data signal and the at least one electric power generation availability data signal. The at least one resident electric power production forecast algorithm is further configured to generate and aggregate a plurality of electric power production forecast data signals.

DETAILED DESCRIPTION OF THE INVENTION

Figure 1:
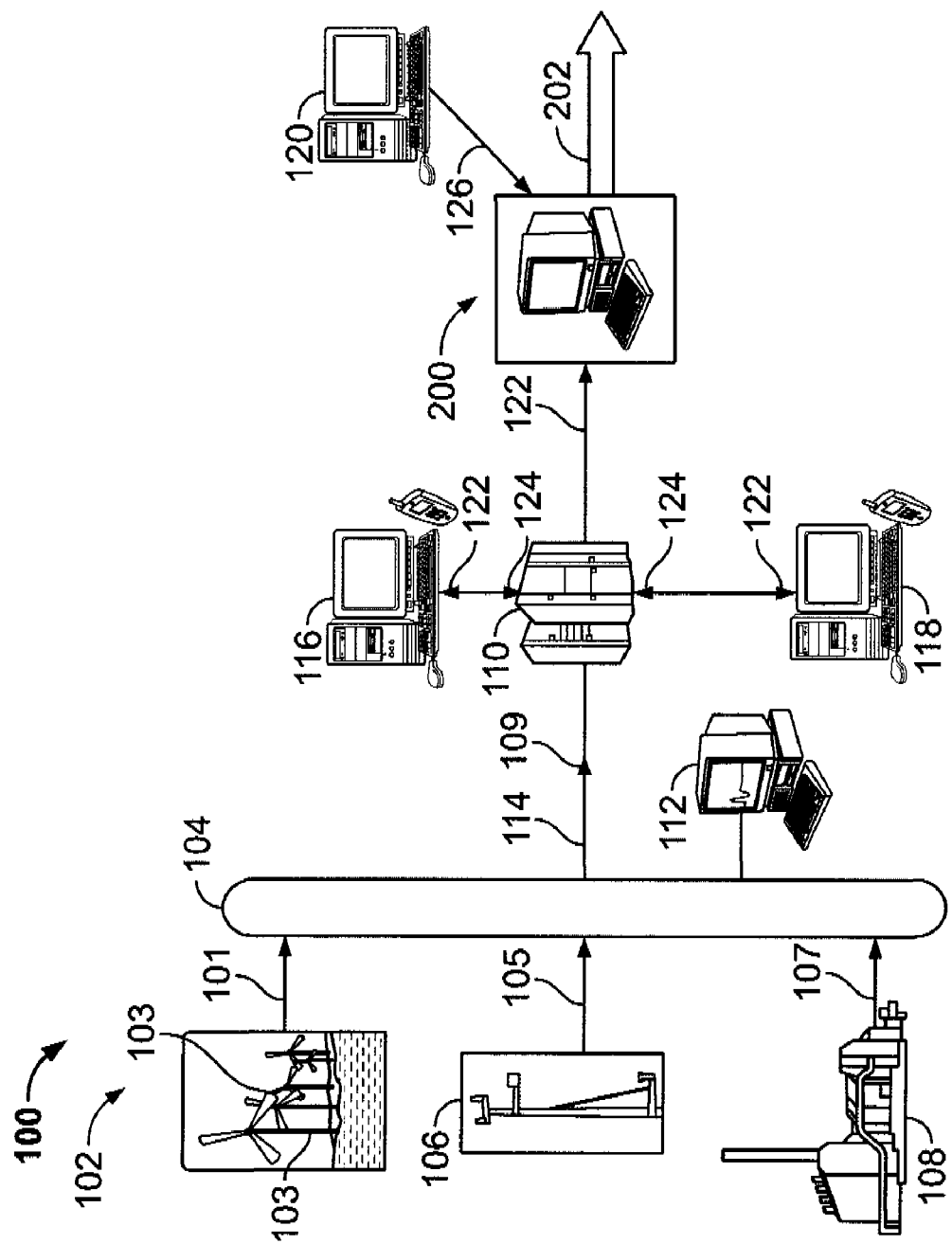
FIG. 1 is a schematic view of an exemplary wind farm monitoring and forecasting network.

FIG. 1 is a schematic view of exemplary wind farm monitoring and forecasting network 100. Network 100 is configured to monitor a plurality of wind turbine generators (WTGs) 102 typically collected within a common geographical region (not shown in FIG. 1), i.e., hereon referred to as a wind farm 102. Wind farm 102 includes a plurality of WTGs 103 that include monitoring devices (not shown in FIG. 1) that measure a plurality of predetermined operational parameters associated with a plurality of predetermined portions of each of WTGs 103, These monitoring devices generate and transmit a plurality of measurement data signals 101, wherein each of signals 101 is associated with a predetermined portion and parameter of WTGs 103. Measurement data signals 101 include, but are not limited to, rotational speeds of at least one electric power generator rotor (not shown in FIG. 1) and a plurality of generated electric power voltages and currents associated with wind farm 102. In the exemplary embodiment, such monitoring devices are coupled in electronic data communication with at least one electronic data communication device 104. Device 104 includes, but is not limited to, at least one Ethernet hub and/or signal conditioner configured within an Ethernet network (neither shown in FIG. 1). Alternatively, any combination of any electronic data devices in any configuration is used.

Network 100 is also configured to monitor a plurality of meteorological conditions that are substantially representative of the geographic region that includes wind farm 102. Network 100 includes at least one meteorological data collection assembly 106. In the exemplary embodiment, assembly 106 is a meteorological mast positioned within wind farm 102 that includes a plurality of meteorological measurement devices (not shown in FIG. 1) that measure a plurality of meteorological conditions that include, but are not limited to, substantially instantaneous wind speed and direction, and ambient air pressure and temperature. These meteorological measurement devices generate and transmit a plurality of measurement data signals 105, wherein each of signals 105 is associated with predetermined meteorological measurements of wind farm 102. Alternatively, assembly 106 is any device positioned anywhere wherein operational performance of network 100 as described herein is facilitated. Assembly 106 is coupled in electronic data communication with device 104.

Network 100 is further configured to monitor at least one electric power transmission and distribution substation 108 that is electrically coupled with wind farm 102. Network 100 further includes a plurality of monitoring devices (not shown in FIG. 1) that measure a plurality of predetermined parameters associated with a plurality of predetermined portions of substation 108. These monitoring devices generate and transmit a plurality of measurement data signals 107, wherein each of signals 107 is associated with a predetermined portion and parameter of substation 108. Such monitoring devices are coupled in electronic data communication with device 104. Measurement data signals 107 include, but are not limited to, status of electric power circuit breakers (not shown in FIG. 1) and a plurality of generated electric power voltages and currents associated with wind farm 102 and an electric power grid (not shown in FIG. 1) to which substation 108 is electrically coupled.

Measurement data signals 101, 105 and 107 that are transmitted into device 104 as described above are typically collectively referred to as operational data signals 109, Moreover, the data contained within such operational data signals 109 is referred to as operational data. Alternative embodiments may include additional electronic data sources. In the exemplary embodiment, operational data is recorded and transmitted substantially continuously. Alternatively, operational data may be recorded and transmitted with any periodicity that facilitates operational performance of network 100 as described herein.

Device 104 is configured to receive operational data signals 109 as described above and is also configured to route and transmit such operational data signals 109 to a plurality of destinations that include, but are not limited to, a Supervisory Control and Data Acquisition system 110, hereon referred to as SCADA 110, and at least one local monitoring station 112. SCADA 110 includes at least one computer (not shown in FIG. 1) that is configured to receive operational data signals 109.

As used herein, the term computer is not limited to just those integrated circuits referred to in the art as a computer, but broadly refers to a processor, a server, a microcontroller, a microcomputer, a programmable logic controller (PLC), an application specific integrated circuit, and other programmable circuits (neither shown in FIG. 1), and these terms are used interchangeably herein. In the exemplary embodiment, memory may include, but is not limited to, a computer-readable medium, such as a random access memory (RAM) (neither shown in FIG. 1). Alternatively, a floppy disk, a compact disc—read only memory (CD-ROM), a magneto-optical disk (MOD), and/or a digital versatile disc (DVD) (neither shown in FIG. 1) may also be used. Also, in the exemplary embodiment, additional input channels (not shown in FIG. 1) may be, but not be limited to, computer peripherals associated with an operator interface such as a mouse and a keyboard (neither shown in FIG. 1). Alternatively, other computer peripherals may also be used that may include, for example, but not be limited to, a scanner (not shown in FIG. 1). Furthermore, in the exemplary embodiment, additional output channels may include, but not be limited to, an operator interface monitor and/or a printer (neither shown in FIG. 1).

Processors for network 100, including those for SCADA 110, process information, including the operational data from device 104. RAM and storage devices store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident averaging and forecasting algorithms. The execution of sequences of instructions is not limited to any specific combination of hardware circuitry and software instructions.

SCADA 110 and station 112 are coupled in electronic data communication with device 104 that is configured to transmit operational data signals 109 substantially continuously to SCADA 110 and station 112. Device 104 transmits operational data signals 109 to SCADA 110 via at least one SCADA input channel 114. SCADA 110 includes at least one database server (not shown in FIG. 1). At least one database schema (not shown in FIG. 1) is electronically generated and stored within the database server within SCADA 110 and the database is configured to generate and store a plurality of database records (not shown in FIG. 1). SCADA 110 receives operational data signals 109 and uses a plurality of resident algorithms to manipulate at least a portion of the data received. For example, a plurality of averaging algorithms are configured to generate a plurality of database records of at least some of the measurements discussed above. At least some of such records include an approximate ten-minute average of the associated measurement. For example, at least some of the records of meteorological measurements received from assembly 106 via device 104 include, but are not limited to, ten-minute averages of wind speed and direction. Also, for example, at least some of the records of individual WTGs 103 in wind farm 102 received via device 104 include, but are not limited to, ten-minute averages of generator electric power output, nacelle wind speed and direction, and operational status information. In the exemplary embodiment, a SCADA database schema is configured such that the database records associated with operational data are stored on a per-WTG 103 and a per-assembly 106 basis. Alternatively, the SCADA database schema may be configured in any manner that facilitates operation of SCADA 10 as defined herein.

In the exemplary embodiment, SCADA 110 is coupled in two-way electronic data communication with at least one remote monitoring and diagnostics (RM & D) work station 116 and at least one remote user work station 118. Alternatively, any number of work stations for any purpose are coupled to SCADA 110. Data signals 122 from SCADA 110 may be displayed on work stations 116 and 118 while operational command signals 124 to SCADA 110 may be transmitted from either of work stations 116 and 118. Network 100 is configured to be facilitate remote access via the Internet. Such access includes security features known in the art. Moreover, network 100 is also configured to be scalable to include additional wind turbines and wind farms (neither shown).

Network 100 is coupled in electronic data communication with at least one external meteorological forecasting data source 120. In the exemplary embodiment, data source 120 includes, but is not limited to, eWind™ meteorological forecasting services commercially available from AWS Truewind LLC, Albany, N.Y. Alternatively, any meteorological forecasting system or service, internal or external to network 100, that facilitates operation of network 100 as described herein may be used with network 100. Data source 120 is configured to transmit regional, wide-area meteorological forecast data signals 126 for the geographical region that includes wind farm 102. Therefore, data signals 126 are wide-area wind forecast data signals. Data signals 126 may include, but are not limited to, wind speed and direction forecasts for time periods that range between one-hour to sixty-hours. In the exemplary embodiment, data signals 126 are received once every twelve hours. Alternatively, data signals 126 are received with any periodicity that facilitates operation of network 100 as described herein.

Network 100 also includes a wind production forecasting system 200 that facilitates network 100 in generating and transmitting at least one wind electric power production forecast data signal 202. System 200 is coupled in electronic data communication with data source 120 and SCADA 110. Moreover, system 200 is configured to receive data signals 126 from data source 120 and data signals 122 from SCADA 110 as is discussed further below. Coupling SCADA 110, system 200 and data source 120 in electronic data communication facilitates flexibility with respect to physically positioning those components. For example, SCADA 110, system 200 and data source 120 may be positioned in separate geographical locations. In contrast, SCADA 110, system 200 and data source 120 may be functionally configured within a single computer (not shown).

During operation, at least some of WTGs 103 are generating electric power by converting wind energy to electric energy as is known in the art. Such electric power is transmitted to substation 108 for further distribution and transmission. WTG output signals 101 are generated and transmitted by each of WTGs 103. Similarly, meteorological data signals 105 and substation data signals 107 are generated and transmitted by meteorological data collection assembly 106 and substation 108, respectively. Data signals 101, 105 and 107 are transmitted to device 104 wherein the data associated with signals 101, 105, and 107 is collectively transmitted to SCADA 110 via input channel 114 and local monitoring station 112 as operational data signals 109. The database within SCADA 110 receives and stores operational data derived from signals 109. Such operational data facilitates accurate wind farm production forecasting by providing accurate historical data to determine wind farm-specific wind speed and direction forecasts and to generate accurate models as discussed further below. Moreover, such data facilitates monitoring the current status of wind farm 102 and each of WTGs 103 such that subsequent production forecasts may be adjusted for time-specific site conditions.

SCADA 110 receives operation command signals 124 from either/or RM&D work station 116 and remote user work station 118. Similarly, work stations 116 and 118 receive SCADA data signals 122. Wind production forecasting system 200 also receives data signals 122. In the exemplary embodiment, system 200 receives data signal 122 including operational data for the past hour in sets of six ten-minute averages. Also, in the exemplary embodiment, data signals 122 are configured in a comma separated variables (CSV) format with associated data tags as is known in the art. Alternatively, operational data in any configuration with any periodicity and with any age of data that facilitates operation of network 100 as described herein may be used. Further, in the exemplary embodiment, regional meteorological forecast data signals 126 are transmitted from at least one external meteorological forecasting data source 120 twice per day via the Internet, typically once every twelve hours. Alternatively, data signals 126 are transmitted with any periodicity and with any age of data that facilitates operation of network 100 as described herein. System 200 generates and transmits wind electric power production forecast signal 202 as described further below.

Figure 2:
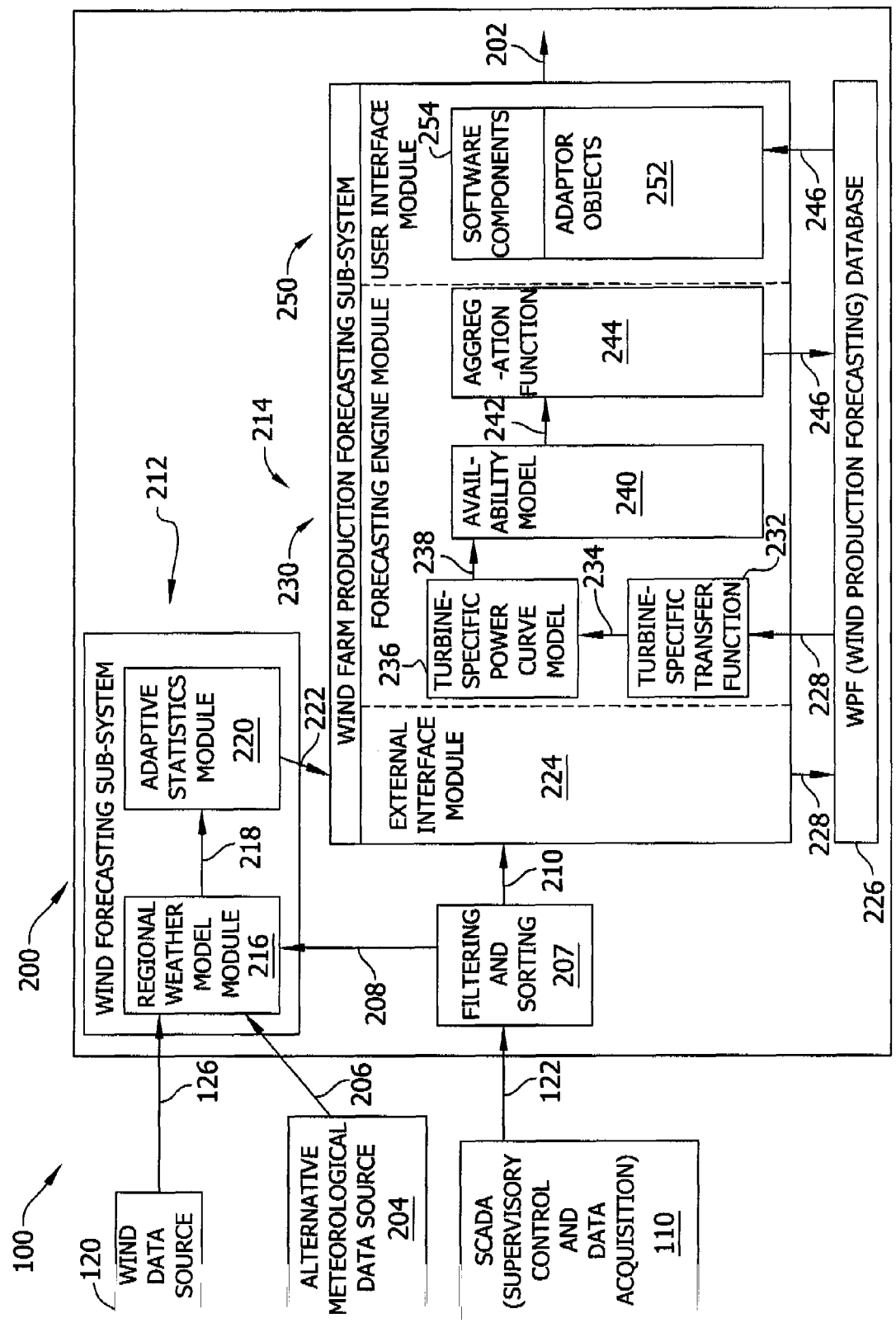
FIG. 2 is a schematic view of an exemplary wind production forecasting system that may be used with the network shown in FIG. 1.

FIG. 2 is a schematic view of exemplary wind production forecasting system 200 that may be used with network 100 (shown in FIG. 1). System 200 is coupled in electronic data communication with data source 120 that is configured to transmit meteorological forecast data signals 126. System 200 may also be coupled in electronic data communication with at least one alternative meteorological data source 204 that includes, but is not limited to, off-site meteorological towers (not shown) that are similar to assembly 106 (shown in FIG. 1) and radar profilers. Source 204 is configured to transmit meteorological data signals 206 that include, but are not limited to, substantially instantaneous wind speed and direction for regions adjoining the region that contains wind farm 102 (shown in FIG. 1). Therefore, data signals 206 are wide-area wind forecast data signals.

In the exemplary embodiment, system 200 is coupled in electronic data communication with SCADA 110 in an object linking and embedding (OLE) for process control (OPC) data-sharing configuration that is known in the art. Alternatively, any method of coupling system 200 in electronic data communication with SCADA 110 that facilitates data transfer as described herein is used. System 200 includes a filtering and sorting logic function block 207 that receives, sorts, filters and transmits data signals 122 to appropriate logic modules within system 200 as described further below. Function block 207 is coupled in electronic data communication with SCADA 110 wherein data signals 122 are configured to be transmitted to function block 207. Function block 207 is configured to filter and sort the associated data into at least two separate data streams that include substantially instantaneous wind farm meteorological data signals 208 and substantially instantaneous wind farm electric power generation data signals 210. Data signals 208 include, but are not limited to, ten-minute averages of wind speed and direction. Data signals 210 include, but are not limited to, ten-minute averages of generator electric power output, nacelle wind speed and direction, and operational status information that includes, but is not limited to, wind turbine availability.

System 200 also includes a wind forecasting sub-system 212. Sub-system 212 is configured to receive wide-area wind forecast data from a plurality of sources, generate a predetermined number of wide-area forecasts for a predetermined period of time, and subsequently transmit such forecasts to a wind farm production forecast sub-system 214 as discussed further below.

Wind forecasting sub-system 212 includes a regional weather model module 216 that is coupled in electronic data communication with data sources 120 and 204 and function block 207. Module 216 is configured to receive data signals 126, 206 and 208 from data sources 120 and 204 and function block 207, respectively. In the exemplary embodiment, data signals 208 are generated hourly while data signals 126 and 206 are typically generated once every twelve hours. Alternatively, any periodicity of any data signal with data of any age received by module 216 that facilitates operation of system 200 as described herein is used.

Module 216 includes a plurality of Mesoscale Atmospheric Simulation System (MASS)-based algorithms (not shown) that are configured to generate statistical and physics-based meteorological models that subsequently generate wind farm-specific wind speed and direction forecast model data signals 218. Such data is based on three-dimensional regional simulations further based on a plurality of differential equations that represent basic physical principles of conservation of mass, momentum and energy and the equation for state of air. Moreover, such forecast model data forms a meteorological model that is used to simulate a predetermined set of localized meteorological responses (static and dynamic) to at least one predetermined localized meteorological condition (static and dynamic).

Sub-system 212 also includes an adaptive statistics module 220 that is coupled in electronic data communication with module 216. Module 220 is configured to receive data signals 218 from module 216. Module 220 is further configured to combine data signals 126 and 204 with data signals 208 to form wind farm-specific meteorological forecast data signals 222 and transmit data signals 222 to sub-system 214. Data signals 222 include, but are not limited to, wind farm-specific wind speed and direction forecast data for a predetermined period of time in the future. Data signals 222 are wide-area wind forecast data signals.

Wind farm production forecast sub-system 214 includes an external interface module 224 that is coupled in electronic data communication with sub-system 212 and function block 207. System 200 also includes a wind production forecasting (WPF) database 226 that is coupled in electronic data communication with sub-system 214, including, but not limited to, module 224. WPF database 226 includes a plurality of electronic database records formed and populated in accordance with a predetermined schema. Module 224 is configured to receive data signals 222 and 210 from sub-system 212 and function block 207, respectively. Module 224 subsequently transmits data signals 222 and 210 to database 226 for storage and subsequent transmitting to other modules within sub-system 214 as illustrated by arrows and discussed further below. Module 224 is further configured to implement predetermined network protocols and formats to facilitate data exchange as described above and to periodically synchronize with sources 120, 204 and transfer function 207.

Wind farm production forecast sub-system 214 further includes a forecasting engine module 230 that is coupled in electronic data communication database 226. Forecasting engine module 230 is configured to transmit and receive data to and from, respectively, database 226. Forecasting engine module 230 includes at least one turbine-specific transfer function block 232 for each of wind turbines 103 (shown in FIG. 1) in wind farm 102. Function block 232 is configured to convert wide-area meteorological data for wind farm 102 into localized, narrow-area, wind turbine-specific meteorological data for each of wind turbines 103. Specifically, function block 232 includes at least one algorithm that generates narrow-area wind turbine-specific wind speed data signals 234 from wide-area wind farm-specific meteorological forecast wind speed data signals 222 transmitted from wind forecasting sub-system 212.

Turbine-specific wind speed data signals 234 are configured to be transmitted to at least one turbine-specific power curve model 236 within forecasting engine module 230. Power curve model 236 includes at least one algorithm that generates a mathematical model of electric power output versus wind speed as a function of measured historical electric power generation for measured historical wind speeds and directions. Such models 236 inherently include turbine- and equipment-specific performance characteristics as a function of a given wind speed and direction that include, but are not limited to, blade rotational speed for given yaw and blade pitch positions.

Power curve model 236 is configured to transmit a plurality of narrow-area, turbine-specific electric power production forecast signals 238 that are configured to forecast electric power generation for a predetermined period of time as a function of wind speed over such period of time. Signals 238 are typically reflective of rated electric power generation capabilities for substantially fully operational equipment associated with a particular wind turbine 103. Signals 238 are configured to be transmitted to an availability model 240 configured within forecasting engine module 230 wherein model 240 is configured to receive signals 238.

Model 240 includes at least one turbine-specific algorithm that is configured to modify signals 238 to generate availability module output signals 242 that are based on known equipment conditions within associated wind turbine 103. For example, a correction factor can be generated based on short-term historical performance of model 240 by comparing forecast data to actual data. Such comparison data can be applied to subsequent forecast data to improve forecast accuracy. Moreover, in the exemplary embodiment, model 240 includes tunable parameters whose values are estimated from historical data. The model parameters can be re-estimated or updated based on recent observations while possibly ignoring observations that exceed a predetermined age. The statistical power of the model is dependent on the size of the sample used for estimating the parameters, and because the sample size should achieve a good balance between statistical power and adaptability to fluent site conditions, the sample size window is typically calculated to facilitate model accuracy. Additionally, exponential smoothing-based methods that gradually fade the effects of observations that exceed a predetermined age may be employed.

Specifically, for example, if a particular wind turbine 103 is operationally derated due to conditions that include, but are not limited to, blade pitch mechanism (not shown) limitations, associated signal 238 is modified to reflect a decrease in the electric power generation capabilities for associated wind turbine 103. Also, specifically, if that particular wind turbine 103 is to remain out of service for any portion of the predetermined period of time, associated signal 242 reflects substantially zero electric power generation for such portion of the period of time.

In the exemplary embodiment, availability model 240 is configured to transmit signals 242 for substantially all of wind turbine generators 103 for wind farm 102 to an aggregation function block 244. Function block 244 is configured to receive signals 242 and sum substantially all of signals 242 associated with a predetermined forecast period. Function block 244 is also configured to transmit wind farm electric power production forecast data signals 246 to database 226 for further use within system 200.

Sub-system 214 also includes a user interface module 250 that is coupled in electronic data communication with database 226. Module 250 is configured to receive wind farm electric power production forecast data signals 246 from database 226 and transmit wind electric power production forecast signal 202 to external entities that include, but are not limited to, electric power dispatchers (not shown). Maintaining database 226 as a separate and distinct portion of system 200 facilitates flexibility of system 200 such that modules 214, 220, 224, 230 and 250 may be configured to be embedded within differing and separate platforms with differing and separate operating systems. Module 250 is configured with a plurality of adaptor objects 252 that include the front end objects that facilitate user interface with database 226 and module 250 as a function of the characteristics of database 226 and the associated platform and operating system. Module 250 is also configured with a plurality of software components 254 that include a plurality of application platform- and operating system-independent objects that execute a substantial portion of the back end processing.

Wind electric power production forecast signals 202 include short-term (10-minute to 48-hour) forecasts of wind farm 102 electric power production based on forecast wind speeds and direction determined at a turbine-specific level.

A method of operating wind farm 102 that includes plurality of wind turbine generators (WTGs) 103 includes generating wind turbine generator (WTG) availability data for each WTG. The method also includes generating wide-area meteorological data for a first geographical region. The method further includes generating narrow-area meteorological forecast data for a second geographical region by transmitting at least a portion of the wide-area meteorological data to at least one resident narrow-area meteorological forecast algorithm. The first geographical region includes at least a portion of the second geographical region. The method also includes generating electric power production forecast data by using at least one resident electric power production forecast algorithm to manipulate the WTG availability data and the narrow-area meteorological forecast data.

During operation, wind changes velocity and direction over periods of time within the wide-area region defined at least partially by wind farm 102. Wind also changes velocity and direction within the narrow-area regions defined locally for each of WTGs 103. Since electric power generation depends upon wind energy delivered to WTGs 103, the power output of wind farm 102 may change rapidly. Such power output changes are reflected in the voltage, current and frequency of the power outputs of the affected WTGs 103. Moreover, such output changes may induce voltage and frequency oscillations in the transmission and distribution grid (not shown) that wind farm 102 is electrically coupled to via substation 108. In some circumstances, such changes may initiate disconnecting wind farm 102 from the grid, thereby permitting wind energy to not be converted to electric power. Disconnecting wind farm 102 from the grid may have economic ramifications.

System 200 receives regional, wide-area, meteorological forecast data signals 126 from data source 120 via regional weather model module 216 that resides in wind forecasting sub-system 212. The wide-area forecast data associated with data signals 126 includes wind speed and direction forecasts between one hour and sixty hours. In addition to data signal 126, module 216 may receive meteorological data signals 206 from sources 204 that include substantially instantaneous wind speed and direction for a wide-area region that includes wind farm 102. SCADA 110 transmits meteorological data signals 208, that include substantially instantaneous wind speed and direction, for a wide-area region that includes wind farm 102, to function block 207. Module 216 subsequently receives data signals 208 from function block 207. Module 216 generates wind farm-specific wind speed and direction forecast model data signals 218 and transmits signals 218 to adaptive statistics module 220. Module 220 receives signals 218 and integrates the associated data to generate wind farm specific meteorological forecast data signals 222 that include wide-area, wind farm-specific, wind speed and direction forecast data for a predetermined time in the future.

Data signals 222 are transmitted to external interface module 224 contained within wind farm production forecast sub-system 214. Module 224 also receives data signals 210 that includes operational data associated with each individual WTG 103. Module 224 transmits data signal 228 to WPF database 226 wherein the data associated with data signals 222 and 210 are stored. A plurality of turbine-specific transfer function blocks 232 receive data signals 228 from database 226 and convert wide-area meteorological data for wind farm 102 into localized, narrow-area, wind turbine-specific meteorological data for each WTG 103. Such narrow-area data is formed into turbine-specific wind speed data signals 234 and are transmitted to turbine-specific power curve model 236. Model 236 generates and transmits power curve output signal 238 that includes data reflective of turbine-specific electric power production forecast data that is based on the narrow-area turbine-specific meteorological data. The turbine-specific electric power production forecast data is formed into signal 238 and is transmitted to availability model 240 wherein WTG-specific operational data is used to generate signal 242. Signal 242 includes data that is reflective of turbine-specific electric power production forecast for a predetermined period of time based on localized, narrow-area wind forecasts as well as known turbine-specific equipment conditions.

Signals 242 for each of WTGs 103 are transmitted to aggregation function block 244 wherein a wind farm electric power production forecast for a predetermined time in the future is generated and transmitted to database 226. Users interface with system 200 via user interface module 250 to extract such wind farm production forecast data.

The method and apparatus for operating a wind turbine generator as described herein facilitate operation of a wind turbine generator. More specifically, the wind production forecasting system as described above facilitates an efficient and effective electric power production scheme. Moreover, the forecasting system facilitates decreasing the errors of accuracy of individual wind turbine generator, and subsequently, wind farm production forecasts such that sales of electric power generation may be made with increased confidence. Such system therefore facilitates revenue generation based on electric power sales. Furthermore, the system as describe herein facilitates reliability of the associated wind farms and the electric power grids to which they are electrically coupled.

Exemplary embodiments of wind production forecasting systems as associated with wind turbine generators are described above in detail. The methods, apparatus and systems are not limited to the specific embodiments described herein nor to the specific illustrated wind production forecasting system.

While the invention has been described in terms of various specific embodiments, those skilled in the art will recognize that the invention can be practiced with modification within the spirit and scope of the claims.

What is claimed is:

1. A method of operating a wind farm that includes a plurality of wind turbine generators (WTGs), said method comprising:

generating wind turbine generator (WTG) availability data for each WTG;

generating wide-area meteorological data for a first geographical region;

generating narrow-area meteorological forecast data for a second geographical region by transmitting at least a portion of the wide-area meteorological data to at least one resident narrow-area meteorological forecast algorithm, wherein the first geographical region includes at least a portion of the second geographical region; and generating electric power production forecast data by using at least one resident electric power production forecast algorithm to manipulate the WTG availability data and the narrow-area meteorological forecast data.

2. A method in accordance with claim 1 wherein generating narrow-area meteorological forecast data for a second geographical region comprises generating meteorological forecast data localized to each WTG.

3. A method in accordance with claim 1 wherein generating electric power production forecast data comprises summing the electric power production forecast data for each WTG.

4. A method in accordance with claim 1 wherein generating WTG availability data comprises receiving WTG operational data aged less than a predetermined period of time for each WTG and manipulating the WTG operational data via at least one resident electric power generation availability algorithm.

5. A method in accordance with claim 4 wherein generating WTG availability data further comprises determining electric power production capabilities of each WTG as a function of a substantially instantaneous condition assessment.

6. A method in accordance with claim 1 wherein generating wide-area meteorological data comprises:
   receiving wide-area meteorological forecast data for the first geographical region;
   receiving wide-area meteorological operational data for the first geographical region aged less than a predetermined period of time; and
   merging at least a portion of the wide-area meteorological forecast data with at least a portion of the wide-area meteorological operational data.

7. A method in accordance with claim 6 wherein receiving wide-area meteorological forecast data for the first geographical region comprises receiving meteorological forecast data for a geographical region that contains the wind farm.

8. A production forecasting system for an electric power generator, said system comprising:
   at least one meteorological forecast input channel configured to transmit at least one wide-area meteorological forecast data signal;
   at least one resident narrow-area meteorological forecast algorithm configured to receive said at least one wide-area meteorological forecast data signal, wherein said narrow-area meteorological forecast algorithm is further configured to generate and transmit at least one narrow-area meteorological forecast data signal;
   at least one resident electric power generation availability algorithm configured to generate and transmit at least one electric power generation availability data signal; and
   at least one resident electric power production forecast algorithm configured to receive said at least one narrow-area meteorological forecast data signal and said at least one electric power generation availability data signal, wherein said at least one resident electric power production forecast algorithm is further configured to generate and transmit at least one electric power production forecast data signal.

9. A production forecasting system in accordance with claim 8 further comprising:
   at least one operational data interface portal;
   a wind forecasting sub-system coupled in electronic data communication with said at least one operational data interface portal;
   an electric power production forecast sub-system coupled in electronic data communication with said at least one operational data interface portal and said wind forecasting sub-system; and
   a wind production forecasting (WPF) database coupled in electronic communication with said electric power generator production forecast sub-system.

10. A production forecasting system in accordance with claim 9 wherein said wind forecasting sub-system is coupled in electronic data communication with said at least one meteorological forecast input channel and comprises at least one adaptive statistics module, wherein said at least one adaptive statistics module comprises a plurality of algorithms configured to generate at least one meteorological model of at least a portion of a predetermined geographical region.

11. A production forecasting system in accordance with claim 9 wherein said at least one operational data interface portal is coupled in electronic data communication with at least one operational database, wherein said at least one operational database comprises at least one table, said table comprises a plurality of operational data records, each of said plurality of data records comprises at least one of:
   electric generator operational data aged less than a predetermined period of time; and
   wide-area meteorological operational data aged less than a predetermined period of time.

12. A production forecasting system in accordance with claim 11 wherein said electric power production forecast sub-system comprises at least one forecasting engine module, wherein said at least one forecasting engine module comprises said at least one resident electric power generation availability and production forecast algorithms, wherein said electric power production forecast sub-system is configured to generate said electric power production forecast data signal based on at least one of:
   at least one wide-area meteorological forecast;
   at least a portion of said operational database table comprising electric generator operational data aged less than a predetermined period of time; and
   at least a portion of said operational database table comprising wide-area meteorological operational data that is aged less than a predetermined period of time.

13. A production forecasting system in accordance with claim 9 wherein said WPF database comprises:
   at least one wide-area meteorological forecast table for a first geographical region comprising at least one wide-area wind speed forecast value having at least one corresponding wide-area wind direction forecast value; and
   at least one narrow-area meteorological forecast table for a second geographical region comprising at least one narrow-area wind speed forecast value having at least one corresponding narrow-area wind direction forecast value, wherein said first geographical region comprises at least a portion of said second geographical region, wherein said at least one narrow-area meteorological forecast table is at least partially derived from said at least one wide-area meteorological forecast table via said at least one resident narrow-area meteorological forecast algorithm.

14. A production forecasting system for an electric power generator in accordance with claim 13 wherein said at least one wide-area meteorological forecast data signal comprises data extracted from at least a portion of said at least one wide-area meteorological forecast table.

15. A production forecasting system for an electric power generator in accordance with claim 13 wherein said at least one narrow area meteorological forecast data signal comprises data extracted from at least a portion of said at least one narrow-area meteorological forecast table.

16. A forecasting network for a wind farm having a plurality of wind turbine generators (WTGs), said network comprising:
at least one operational database comprising operational data;
at least one meteorological forecasting data source; and
at least one production forecasting system coupled in electronic data communication with said at least one operational database and at least one meteorological forecasting data source, said at least one production forecasting system comprises at least one meteorological forecast input channel, at least one resident narrow-area meteorological forecast algorithm, at least one resident electric power generation availability algorithm, and at least one resident electric power production forecast algorithm, wherein said at least one meteorological forecast input channel is configured to transmit at least one wide-area meteorological forecast data signal, said at least one resident narrow-area meteorological forecast algorithm is configured to receive said at least one wide-area meteorological forecast data signal, wherein said narrow-area meteorological forecast algorithm is further configured to generate and transmit at least one narrow-area meteorological forecast data signal, said at least one resident electric power generation availability algorithm is configured to generate and transmit at least one electric power generation availability data signal, and said at least one resident electric power production forecast algorithm is configured to receive said at least one narrow-area meteorological forecast data signal and said at least one electric power generation availability data signal, wherein said at least one resident electric power production forecast algorithm is further configured to generate and aggregate a plurality of electric power production forecast data signals.

17. A forecasting network for a wind farm in accordance with claim 16 further comprising:
at least one operational data interface portal;
a wind forecasting sub-system coupled in electronic data communication with said at least one operational data interface portal;
an electric power production forecast sub-system coupled in electronic data communication with said at least one operational data interface portal and said wind forecasting sub-system; and
a wind production forecasting (WPF) database coupled in electronic communication with said electric power generator production forecast sub-system.

18. A forecasting network for a wind farm in accordance with claim 17 wherein said wind forecasting sub-system is coupled in electronic data communication with said at least one meteorological forecast input channel and comprises at least one adaptive statistics module, wherein said at least one adaptive statistics module comprises a plurality of algorithms configured to generate at least one meteorological model of at least a portion of a predetermined geographical region.

19. A forecasting network for a wind farm in accordance with claim 17 wherein said at least one operational data interface portal is coupled in electronic data communication with at said at least one operational database, wherein said at least one operational database comprises at least one table, said table comprises a plurality of operational data records, each of said plurality of data records comprises at least one of:
electric generator operational data aged less than a predetermined period of time; and
wide-area meteorological operational data aged less than a predetermined period of time.

20. A production forecasting system in accordance with claim 19 wherein said electric power production forecast sub-system comprises at least one forecasting engine module, wherein said at least one forecasting engine module comprises said at least one resident electric power generation availability and production forecast algorithms, wherein said electric power production forecast sub-system is configured to generate said electric power production forecast data signal based on at least one of:
at least one wide-area meteorological forecast;
at least a portion of said operational database table comprising electric generator operation data that is aged less than a predetermined period of time; and
at least a portion of said operational database table comprising wide-area meteorological operational data that is aged less than a predetermined period of time.

* * * * *